United States Patent

Stuettler

[11] Patent Number: 6,133,945
[45] Date of Patent: Oct. 17, 2000

[54] METHOD AND DEVICE FOR SHOWING STEREOSCOPIC VIDEO IMAGES ON A DISPLAY

[75] Inventor: Herbert M. Stuettler, Rankweil, Austria

[73] Assignee: Leica Microsystems AG, Heerbrugg, Switzerland

[21] Appl. No.: 08/793,115

[22] PCT Filed: Aug. 19, 1995

[86] PCT No.: PCT/EP95/03299

§ 371 Date: Feb. 19, 1997

§ 102(e) Date: Feb. 19, 1997

[87] PCT Pub. No.: WO96/06507

PCT Pub. Date: Feb. 29, 1996

[30] Foreign Application Priority Data

Aug. 19, 1994 [CH] Switzerland ............................ 2549/94

[51] Int. Cl.[7] .................................................. H04N 13/04
[52] U.S. Cl. ................................ 348/51; 348/47; 345/419
[58] Field of Search .................................. 348/51, 59, 42, 348/46, 79, 52, 744, 745, 754, 756, 80, 56, 47; 345/7, 8, 115, 419, 426, 434, 139; H04N 13/04

[56] References Cited

U.S. PATENT DOCUMENTS

| 4,737,921 | 4/1988 | Goldwasser et al. ................... 345/426 |
|---|---|---|
| 4,818,858 | 4/1989 | Sorimachi et al. ....................... 348/42 |
| 4,879,668 | 11/1989 | Cline et al. ............................. 345/426 |
| 4,882,679 | 11/1989 | Tuy et al. ............................... 345/139 |
| 4,943,938 | 7/1990 | Aoshima et al. ....................... 345/422 |
| 5,142,357 | 8/1992 | Lipton et al. ............................. 348/59 |
| 5,175,616 | 12/1992 | Milgram et al. .......................... 348/47 |
| 5,241,656 | 8/1993 | Louks et al. ............................ 345/345 |
| 5,510,832 | 4/1996 | Garcia ...................................... 348/42 |
| 5,751,927 | 5/1998 | Wason .................................... 345/419 |
| 5,870,137 | 2/1999 | Stuettler .................................. 348/51 |

*Primary Examiner*—Chris S. Kelley
*Assistant Examiner*—Gims S. Philippe
*Attorney, Agent, or Firm*—Foley & Lardner

[57] ABSTRACT

The invention concerns a method and device for displaying, on a monitor (11), stereoscopic video images of observed scenes. The method avoids unphysiological apparitions on the monitor (11) in image areas which are remote from the convergence plane (19) by creating a blanked-out area in which the relevant image areas are displayed differently. The invention makes it easier for users to work for lengthy periods on such monitors (11) and in particular on video stereomicroscopes.

56 Claims, 4 Drawing Sheets

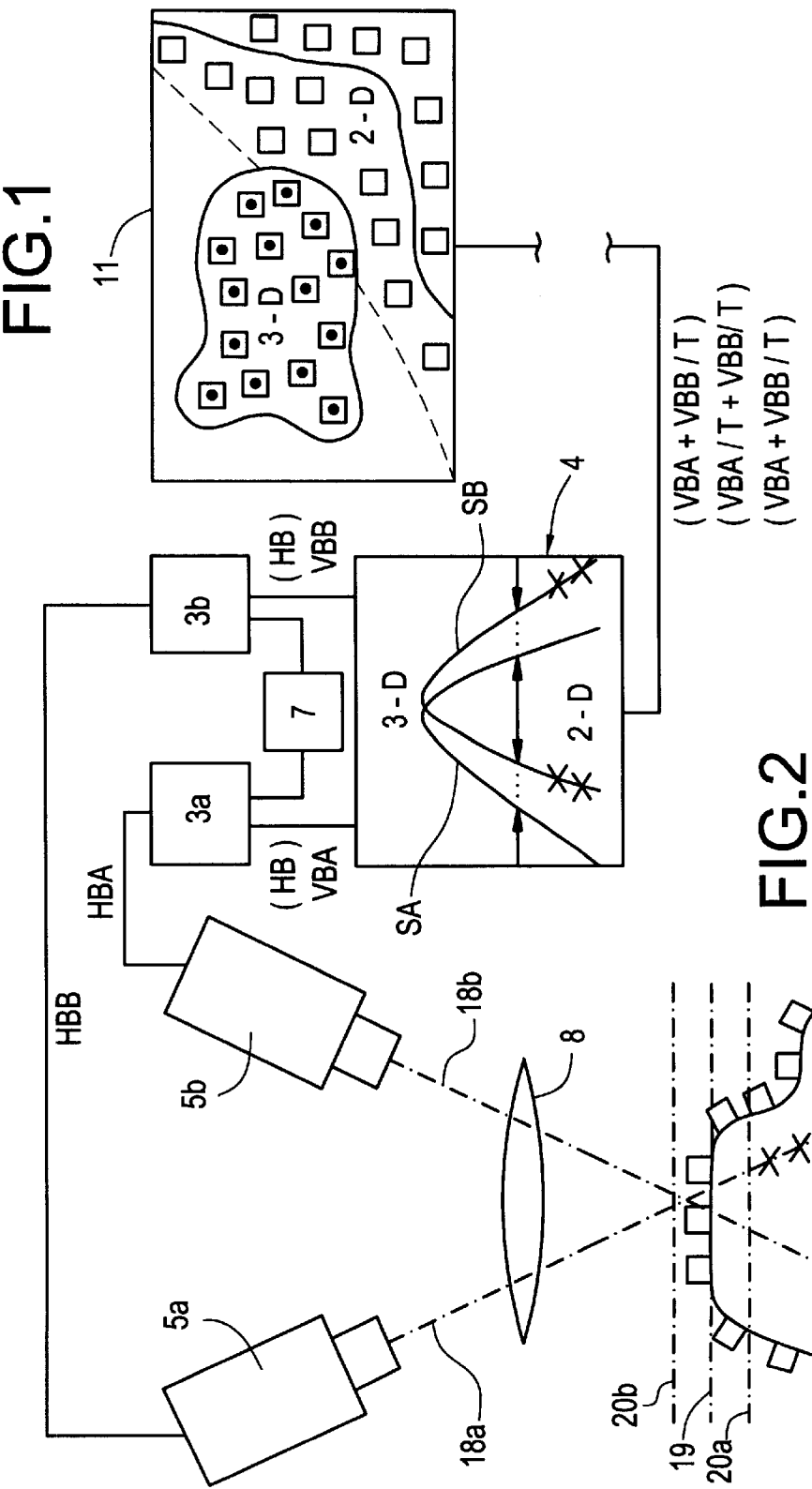

Channel A

Channel B

, 945

METHOD AND DEVICE FOR SHOWING STEREOSCOPIC VIDEO IMAGES ON A DISPLAY

BACKGROUND

1. Field of the Invention

This application relates to a method and a device for showing stereoscopic video images on a display, in particular video images which are obtained in real time when viewing an object through a video stereomicroscope.

2. Description of Related Art

Such methods are known and are associated in practice with a certain outlay in order to ensure that the stereo images reproduced on a monitor are also of satisfactory quality. The fact that it is necessary to display one right-hand and one left-hand partial image each per displayed stereo image gives rise to various image-processing problems, for example that right-hand and left-hand partial images are displayed in the correct sequence on the monitor. DE-C-4134033 specifies such methods, for example in column 4, line 57 to column 5, line 36.

However, it is still not enough purely to display the partial images in the correct position on a monitor. Thus, in particular, the focal length of the two recording devices should also correspond, and devices should be provided which permit a viewer to view the partial images on the monitor. In video stereomicroscopes (surgical microscopes), the problem of focusing is slight whenever use is made of only one objective, through which both video cameras, or else only one video camera with a suitable recording possibility for a right-hand and a left-hand image channel (for example mirror stereoscope basis), are directed.

Also important, moreover, is the viewing quality of the displayed stereo images on the monitor, for which, in addition, physiological factors also play a role. Zoom objectives serve the purpose, for example, of optimum selection and enlargement of an image section; illumination settings permit the object to be illuminated to suit the eye, etc.

However, a problem which has not yet so far been satisfactorily resolved results from the circumstance that the human eyes are always set to a fixed stereobasis, specifically the fixed interoccular distance of the person involved.

Particularly in the case of an enlarged display of objects which are viewed, for example, through a microscope, unnatural stereo effects arise which are caused, inter alia, by the stereobasis, which apparently varies during the enlargement. This even plays a positive role in the neighboring depth of field to the convergence plane, since an apparently enlarged stereobasis produces an improved 3-D effect and the depth of perception at the object being viewed is improved. However, the further away the object details are on the convergence plane, the more unnatural the actually perceived image appears. Since in the regions remote from the convergence plane, above all, the apparent stereobasis no longer at all corresponds to that which the viewer is accustomed to seeing and, in addition, an intensified impression of unsharpness is also produced there (after all, the viewing optical system is focused onto the convergence plane, as a rule), this leads to a taxing additional stress in the viewer's visual apparatus, above all in the brain. This additional stress is sometimes felt as unpleasant, but is sometimes initially not perceived at all. In both cases, however, headache and poor vision can be produced thereby, as a result of which, in particular, the viewing period at such a microscope is distinctly reduced. Apart from this, it is then also possible to detect the relevant regions of the object only with particular difficulty.

BRIEF SUMMARY OF THE INVENTION

By contrast, it is the object of the invention to find a simple and reliable method, and a corresponding device, in which the described interfering effects are reduced or avoided.

This object is achieved, in particular, by the method steps as described in claim 1, and further solved more specially by further improved method sequences or variants thereof as described in the dependent claims. Either the reproduction quality is improved in these affected spaces, or these spaces are separated off or simply not even displayed on the monitor at all.

The video partial images are obtained in a known way, for example by two image-acquiring units (there could also only be one image-acquiring unit with a mirror stereoscope basis). The technology such as is described in Swiss Patent Applications Nos. 3890/93-3, 135/94-3, 949/94-2, 1525/94-0 and 1295/94-8 is preferred. The images are then further processed in a known way and as required - for example as described in Swiss Patent Application No. 1524/94-8.

According to the invention, there is the new feature that it is detected by image processing which of the details viewed on the object are situated in the immediate region of the convergence plane and which are remote therefrom. Using the knowledge resulting from this detection, the detected regions in which it is impossible to expect a good 3-D display are subjected to further image processing and either

- blanked out and completely erased as screen content;
- replaced by a monochrome colored area;
- converted to a 2-D display (it is only, for example, the screen content of one image channel which is reproduced there—either facing only one eye, or else also by virtue of the fact that the corresponding screen content of a channel is also transmitted via the other channel, and this leads to approximately the same screen brightness as in the space of the 3-D display); or
- converted by an interpolation calculation such that the effective apparent stereobasis in this space is narrowed down (reduced to zero=2-D, in the extreme case), in order to generate a less extreme and adapted 3-D (or 2-D) display. The conversion can be done both for one image channel and simultaneously for the other image channel.

In addition, or also as an alternative to these measures in exceptional cases, the corresponding screen content can also have its brightness reduced in comparison with the 3-D space, and/or can be colored using false colors. Apart from this, it may also be advantageous to display the dividing line between the two spaces in an optically visible fashion, for example as a contour line.

Consequently, for the viewer the result according to the invention is a separation between the space in which, starting from a single stereobasis, he has a 3-D perception (as a rule, this is the region which is actually of special interest to him and which is focused on), and another space in which 3-D perception is dispensed with or converted into another apparent stereobasis, and/or where the viewer is at least advised of the difference between the two spaces.

It is true that image processing for the purpose of changing screen content is already known in principle; thus, for example, SU-A-573907, SU-A-1107144, U.S. Pat. No. 4,811,090 and DE-C-4029019 describe methods for image enhancement of a general nature such as, for example, contrast enhancement, etc. Also known is image processing for the purpose of automatic detection of specific object details, for example in the field of hematology; likewise known is image processing for the purpose of controling the objective or the microscope as described, for example, in JP-A-6098787, EP-A1-229581 and EP-A2-336608; moreover, it is known to use image processing to displace stereoscopic partial images relative to one another or to change their stereobasis in a virtual fashion as a function of the monitor size, in order thereby to shift the convergence plane in a virtual fashion into other spaces, or generally to improve the 3-D reproduction as described, for example, in U.S. Pat. No. 3,818,125, U.S. Pat. No. 4,875,034 and WO-9213427.

By contrast, the complete division of the image in accordance with the above points of view into at least 2 partial spaces is novel and provides the advantages according to the invention.

The assignment of the spaces of the video partial images before the reproduction of the recorded video signal can be accomplished by various methods; to this extent, the invention is not restricted to the exemplary embodiments represented.

Appropriate methods—chiefly for detecting the position of the focal plane and of the convergence plane—are known to the person skilled in the art and are also specified partly in the abovementioned prior publications. Appropriate passages are considered as being within the scope of this disclosure. The abovementioned Swiss Patent Applications are each hereby incorporated by reference as if fully set forth herein. Preferred exemplary embodiments of this invention can be realized with the aid of the teaching given there.

It is not significant for the essence of the invention whether the processed video images come from an online recording, possibly from a video recorder, or are computer-generated at all. It is preferred, in any case, for all the electronic components to be selected such that real time processing is possible. A non-interlaced display (progressive scan) with a refresh rate of 100–200 Hz is preferred, in any case.

Briefly, in accordance with another aspect of the invention, there is provided a method for showing stereoscopic video images, characterized in that two image-acquiring devices (5a and 5b) for taking images which are to be displayed on a monitor (11) are automatically adjusted such that a focal plane coincides with a convergence plane (19), and two spaces are determined by sensing a display sharpness at CCDs (2a and 2b) of the image-acquiring devices (5a and 5b).

BRIEF DESCRIPTION OF THE DRAWINGS

Further details of the invention are to be gathered from the claims, the figures and associated parts of the description. In this case, FIG. 1 shows a display of a device according to the invention, which display is connected to an image-processing device (image computer);

FIG. 2 shows a diagrammatic design with such an image computer;

Identical reference symbols signify identical components. Identical reference symbols with different indices signify similar components.

DETAILED DESCRIPTION OF A PREFERRED EMBODIMENT

The following applies within the meaning of the invention:

A stereoscopic video image of two matching partial images of a left-hand and right-hand image channel, the partial images having at least one video field (HB), but are constructed, if appropriate, as a frame in which they are composed of a matching pair (VB) of two fields (HB). Within the meaning of the invention, such a pair (VB) can also comprise two sequential (interlaced) fields (HB) or two simultaneously present, and thus no longer separated fields (progressive scan). Interpolated partial images are partial images which are obtained by computer evaluation of available image information from a partial image or a section thereof.

The letters A and B stand for the left-hand and right-hand image channel, respectively, of a video stereoimage. /T stands for a section of an image or of a partial image.

Figure 5:
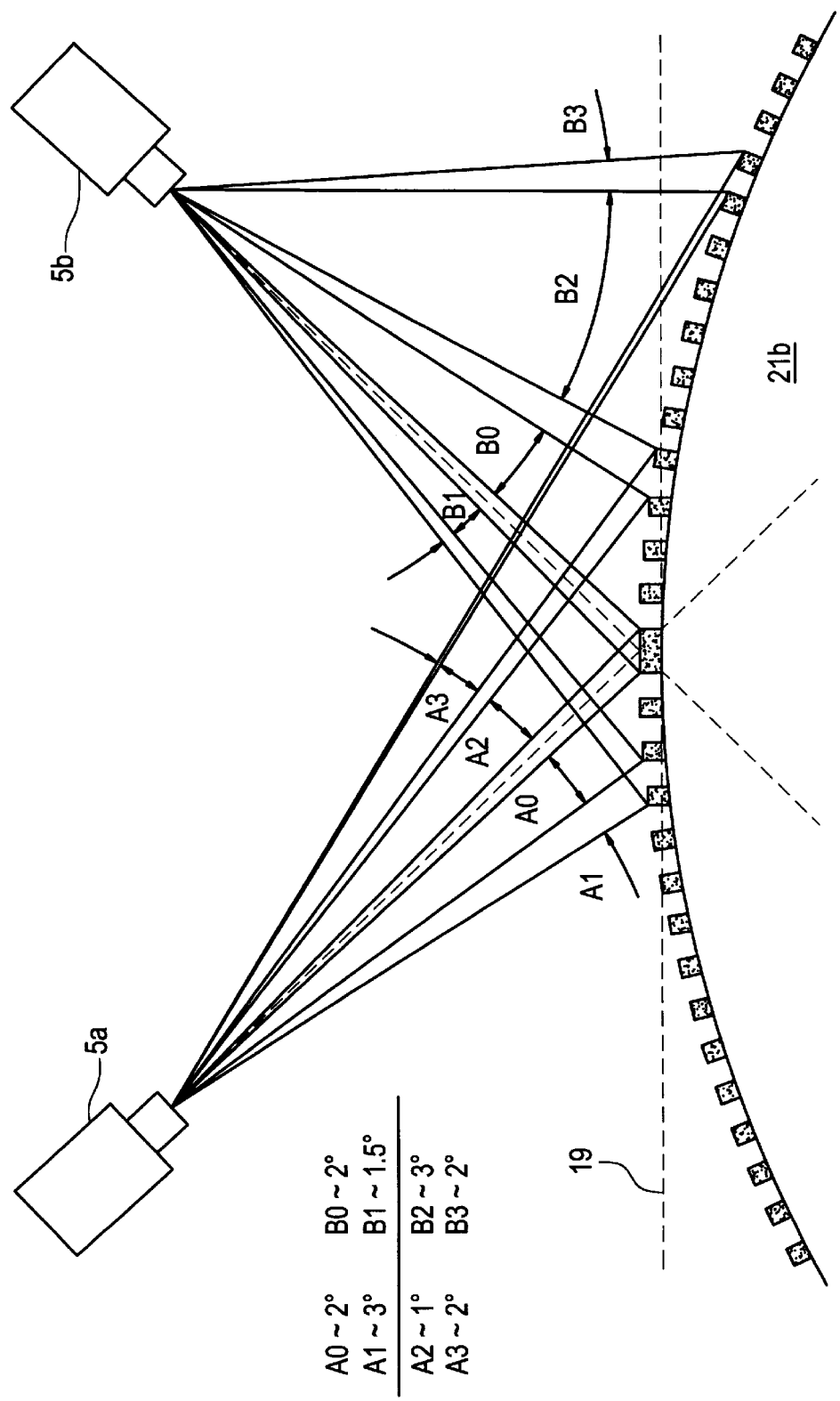
FIG. 5 shows a similar design, with a detailed representation of angular dimensions.
Figure 6:
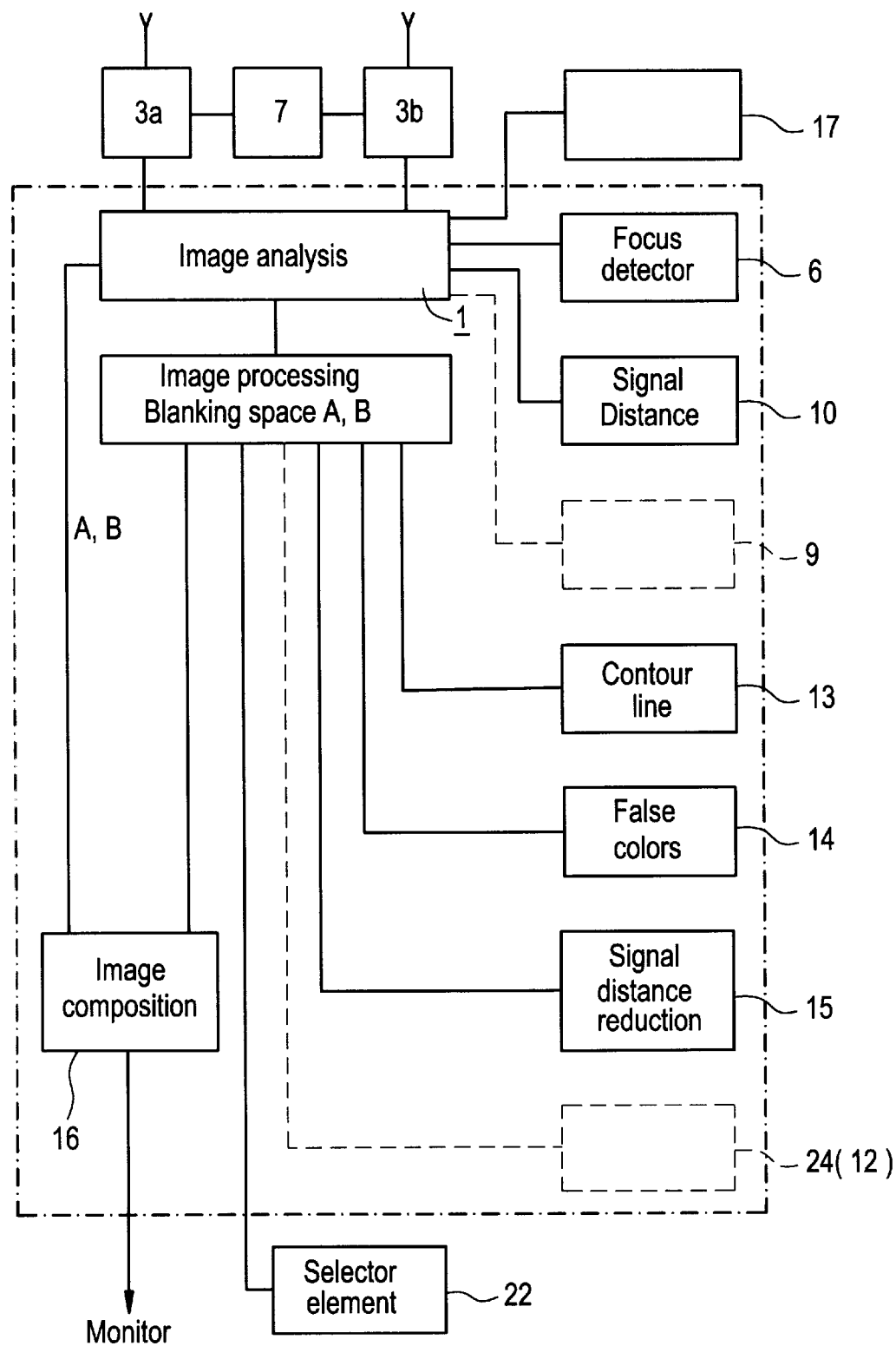
FIG. 6 shows a diagrammatic design of the circuit arrangement in the image computer.

The following paragraphs provide further descriptions of the figures with reference to particular reference numerals.
1 Image analyzer; this includes microprocessors, which determine the position of individual image details on the object 21 being viewed from digital image information, for example from the camera electronic system 3. They can be adjusted by operating staff in accordance with specific criteria, for example in order arbitrarily to set the range 20a–20b. They cooperate by means of various measuring circuits 6, 10, 23. Present at the output of 1 is, on the one hand, the image information of the 3-D space, and on the other hand the image information, still to be modified, of the blanking space.
2a,b Diagranmmatic CCD of a camera; the image of the camera 5a,b of FIG. 5 is to be seen diagrammatically in FIG. 3. Because of their symmetrical arrangement, the vertical bar of cubes of the cross is mirror-symmetric relative to the image of the horizontal bar of cubes.
3a,b Camera electronic system; is connected, in particular, to a frame grabber (which includes all electronic circuits which convert signals of a video frame or video field into signals which can be processed further digitally and condition -them for display on a computer monitor). For the purpose of this invention, the camera electronic system also contains all the elements required to produce the desired image formats.
4 Image computer, device for detecting actual states on the object 21 being viewed, in conjunction with the viewing optical system (for example, detecting the focal plane and the convergence plane 19 as well as distances from details of the object to these planes), for example by investigating the pixel content on the CCDs, and parameter-controled conversion of existing image signals for the purpose of display, enhanced in accordance with the invention, on a monitor 11.
5a,b Image-acquiring device; this includes stationary or moving video cameras, any CCD or other optoelectronic array circuits etc.; two cameras 5a,b are represented diagrammatically in each case in the exemplary embodiments.

However, the invention is not restricted to this. Of course, the scope of the invention also includes variants having only one camera with only one CCD to which image signals of the left-hand and right-hand image channels are supplied alternately via a stereobasis produced, for example, by mirrors. Likewise, neither does the diagrammatic representation entail any restriction to live recordings; for the purpose of the invention the two cameras 5a and 5b can also be replaced by corresponding signal outputs from a stereo video recorder, from a computer for generating stereo images or the like.

6 Focus detector; this includes all the electronic circuits which deduce the position of the set focus with reference to the object 21 from the image analysis; as a rule, detecting the position of the focus means, at the same time, detecting the position of the convergence plane if the latter are coupled by optical measures. If appropriate, this circuit can also be used to detect the depth of field range per se, which is then defined, as the case may be, as the 3-D imaging range 20a–20b of display.

7 Camera synchronization system; this includes synchronizing elements which both synchronize two camera electronic systems relative to one another and, if appropriate, also clock further elements for image processing and/or generate signals which can, if required, be recorded on video data carriers (not represented in this application).

8 Common objective for two cameras, for example in a surgical microscope.

9 Further suitable circuit for supporting the image analysis.

10 Signal distance detector, is that electronic circuit which in the case of virtual superimposition of identical object details—viewed from the right-hand and left-hand image channels—determines the distances between them. In practice, these distances become ever larger the further the object details are removed from the convergence plane. These distances can also be used to infer the range limits to be drawn, because the physiological problems mentioned at the beginning ensue starting from a specific magnitude of the distance.

11 Monitor; this includes all image-representing units and displays, in particular cathode-ray tubes preferably having a low persistence time, for example below 10 ms, for circuits with a high refresh rate, as well as LCD displays etc.

12 Interpolator; this includes devices which generate from two sets of image information—if appropriate, using non-linear algorithms—a third which is coused for the purpose of displaying on the monitor 11. Even if this is not explicitly specified in the exemplary embodiments, also within the scope of the invention are variants in which there is multi-stage interpolation, for example in which firstly a field is used to produce two matching fields by filling the line interspaces of a field with interpolated image information, preferably obtained from the image information of the two lines, bounding the line interspaces, of the relevant field, whereupon specific image signals are again converted or blanked out later from the frame derived therefrom after comparison with the frame of the other image channel.

13 Contour line generator; after detection of the boundary between the 3-D space and the blanking space, this generator can retrace the boundary with a line.

14 False color generator; if required, recolors the screen content of the blanking space.

15 Signal distance reducer; can reduce by computer the magnitude of the distance obtained by the signal distance detector 10, in order in this way either in the blanking space of one partial image to shift the screen content closer to the screen content of the blanking space in the other partial image, or to move the two screen contents in the two blanking spaces symmetrically relative to one another in a virtual fashion, from which a 2-D display is produced in the extreme case.

16 Image compositor; combines the image information for the 3-D space and for the blanking spade, if appropriate also drawing the boundary line, in order to permit a uniform display on the monitor 11.

17 Adjusting unit; an operator can intervene here in order to change the criteria according to which the space was analyzed, for example in order to change the range between 20a and 20b, or to define the criteria according to which the image analysis is to be carried out.

18a,b Optical axis.

19 Convergence plane.

20a,b 3-D display boundary.

21 Object.

22 Selector element; serves to adjust and select at will according to the desired type of modification to which the blanking space is to be subjected.

23

24 Arbitrary further suitable circuit for modifying the screen content of the blanking space.

In the preferred variant in accordance with FIG. 2, the images of a pair of stereo images which are assigned to the right-hand and left-hand eyes are recorded by matching cameras 5a,b, for example in accordance with the two first named Swiss patent applications. Reference is made to the statements there. It is preferred in this case to use a common main objective 8.

After conventional conversion of the video signals from the CCDs 2a,b of the image-acquiring units 5a,b in the camera electronic system 3a,b into signals which can be processed digitally, those regions which are situated, for example, on the object 21a outside the range 20a–20b, that is to say around the convergence plane, are acquired in the image computer. These spaces are then blanked out in at least one partial image, as is indicated symbolically in the diagram in the image computer 4 by xxx.

The diagram in this case represents symbolically a screen content (video signal) of the right-hand channel SA and a corresponding video signal of the left-hand channel SB. The signals (screen contents) are laid one above another in a virtual fashion. Because of the convergence, the corresponding pixels are spaced apart from one another. The convergence plane is located in the region of the smallest spacing. Up to the range represented by dots and dashes, there is still no problem, for example, physiologically with drifting apart of the signals. However, the problems described at the beginning do occur if, for example, the spacings become so large as represented diagrammatically below the line. Consequently, one subspace of one partial image is blanked out here.

A bipartite image signal is supplied on the monitor 11 of FIG. 1 by this blanking out, the bipartite images of the two channels being fed alternately to an image monitor 11 via the image computer 4. In this case, the images are, in particular, displayed on the image monitor 11 as frames with double the vertical deflection frequency, if appropriate also after application of the method, specified in the Swiss Patent Application No. 1524/94-8, to increase the refresh rate by interpolation of fields.

The bright space (3-D space) represented diagrammatically on the monitor 11 is that space in which the scene is displayed in 3 dimensions, while modified screen content is displayed in the darker blanking space. Two different blanking spaces are represented—separated by the dashed line—diagrammatically in FIG. 1.

The entire screen content is erased in the left-hand blanking space; a 2-D display is made in the right-hand one by imaging there only a partial image of the pair of stereo images. The result for the viewer is a simultaneously effective reduction in brightness. The claims describe variants to this process which are specified in part diagrammatically below the image computer as well: /T signifies the blanking space in this case. The signals from these processes are fed to the monitor 11. The 3-D space is bounded symbolically on the object 21a by the lines 20a,b. As is known, the two camera electronic systems are synchronized by a camera synchronization system 7.

Figure 3A:
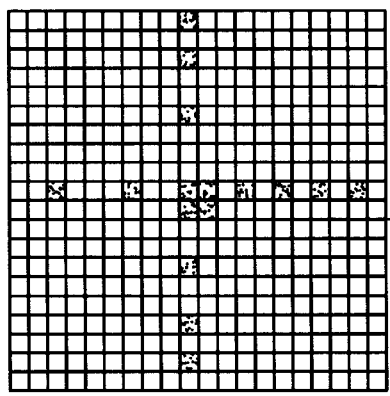
FIG. 3 shows a diagrammatic representation of the inputs into the two CCDs of two video cameras which are viewing a cross of cubes on a spherical cap in accordance with FIG. 4.
Figure 3B:
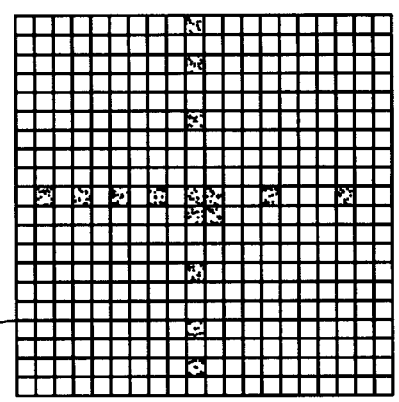
Figure 4:
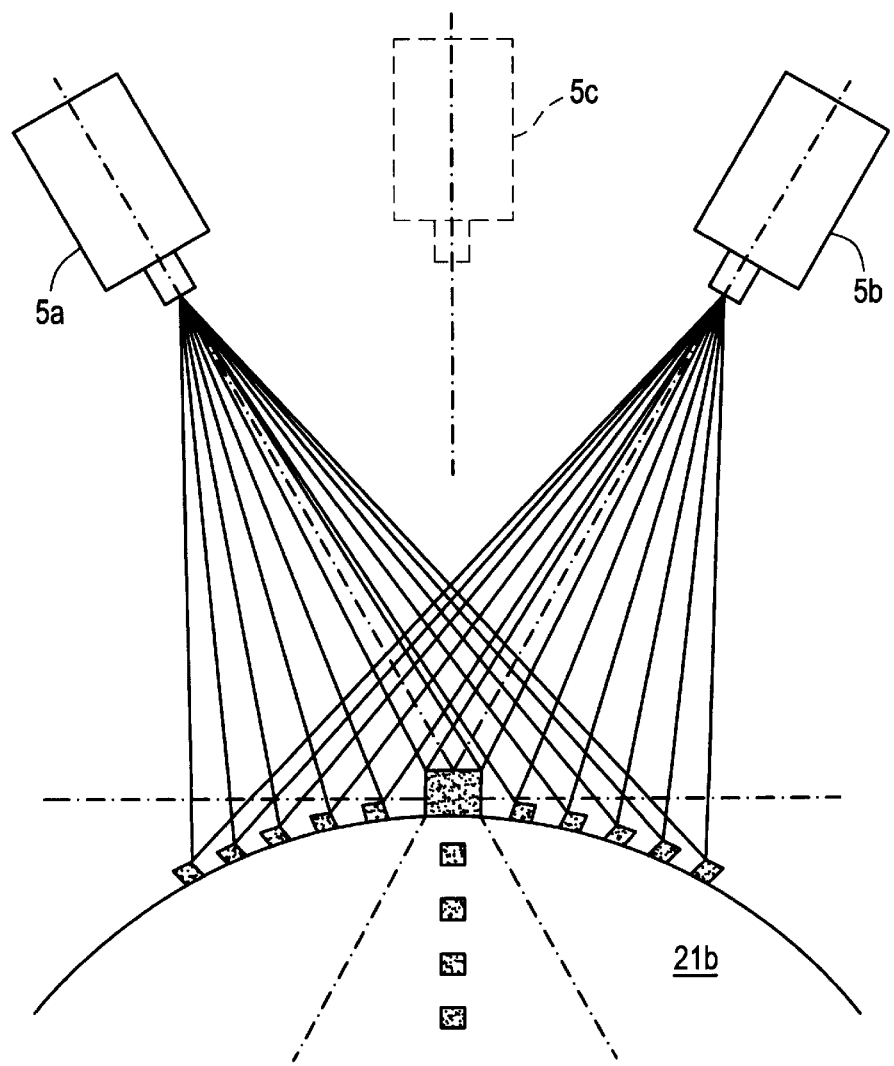
FIG. 4 shows a diagrammatic design with a cross of cubes on a spherical cap in the focus of two stereo-videocameras, the latter being arranged symmetrically relative to the vertical bar of the cross.

FIGS. 3 and 4 relate to a further diagrammatic representation of an object 21b, in this case a cross of cubes on a spherical cap. The pick-up position of the cameras 5a and 5b is to be seen in FIG. 4, while FIG. 3 indicates diagrammatically how the cubes (in each case the size of 1 pixel) are imaged differently on the two CCDs 3a,3b.

In the case of a method according to the invention, the image computer 4 can now detect the differences between the circuit states of the CCDs 2a,b, and can thereby carry out the evaluations and signal conversions specified in the claims. Also represented diagrammatically in FIG. 4 is the virtual camera 5c which in one of these methods is apparently positioned at the location shown, in order to pick up there in 2 dimensions those images which are then displayed exclusively in the blanking space on the monitor 11. The advantage in such a method results in that the transitions between the 3-D space and blanking space are not too abrupt, and that the display in the blanking space is not imaged one-sidedly from an oblique view, as is the case if only the image information in the blanking region of one partial image is blanked out while that of the other partial image, however, is fed to the monitor 11 as image information—be this only in channel A or also in both channels.

It will be clear to the person skilled in the art that the method according to the invention can also be performed over the plurality of stages by producing a plurality of blanking spaces, depending on the distance of the corresponding regions on the object 21 from the convergence plane 19. In a fashion resembling the steps in the case of confocal stereomicroscopy, it is possible in this way to produce a fundamental image enhancement, the viewer needing to pay heed to the fact that the dimensions and longitudinal magnifications differ in the 3-D space and the blanking spaces, but this can be accepted with a little practice, the more so since—as described at the beginning— at least the subtle interference effects are eliminated.

FIG. 5 may also serve to improve understanding; it represents a comparable situation to that in FIG. 4; however, reference is also made to the angular differences from the view of the two cameras when viewing one and the same object (distances between cubes on a spherical cap).

After detecting which image information relates to identical objects in the two image channels, the image computer 4 can therefore, for example, also use the different sizes of these objects (or their dimensions; here: distances between the cubes) as a measure of the blanking space. It is indicated here diagrammatically, for example, that the spaces should be blanked out with an angular difference (this is, of course, pixel spacings at the CCD) of greater than 1.5°. In the particular case, in the 3-D space only the three cubes immediately next to the central cube would therefore be displayed at the zenith on the motor, while the remaining cubes would already fall into the blanking space.

eb;normal

What is claimed is:

1. A method of showing stereoscopic video images of stereoscopic scenes on a monitor, the scenes on the monitor being screen content, each stereoscopic video image being composed of at least two matching partial images of which each partial image is assigned to a specific one of two video channels, comprising:

determining the position of a convergence plane of two optical beam paths assigned, respectively, to the two channels;

determining the position of detail points of the screen content which are further than a specific distance from the convergence plane, the specific distance defining a near zone of the convergence plane;

image processing the video signals corresponding to the detail points wherein the video signals, reproduced on the monitor, of at least one partial image are modified such that at least two different X-dimensional display spaces of the video images or of the screen content appear simultaneously on the monitor, wherein a first display space for detail points in the near zone of the convergence plane comprises a desired 3-D display, and wherein a second display space, denoted as a blanking space, for detail points outside the near zone of the convergence plane has at least one of the following modifications in comparison with the desired 3-D display;

the blanking space is completely blanked out, as a result of which any display is suppressed;

the blanking space is replaced by a monochrome, structureless two-dimensional display;

luminosity of the blanking space is reduced;

the blanking space is colored using false colors; or the blanking space is displayed in only two dimensions.

2. The method of claim 1, wherein at least one of the following modifications is made to the blanking space: the image information of respectively only one of the two partial images is blanked out, while the corresponding space of the other partial image is displayed unchanged, or an edge definition or a contrast is changed in the blanking space, or the blanking space is visibly separated from the desired 3-D display by an artificially inserted dividing line.

3. The method of claim 1 wherein the image information of the blanking space of one partial image is blanked out and is replaced by the corresponding image information from the blanking space of the other partial image, with the result that the display is performed entirely in two dimensions on an angle of view of only one beam path.

4. The method of claim 1, further comprising:

superimposing virtually on one another, in an image computer, the image information of one of the partial images and the image information of the other partial image;

measuring a distance between corresponding image detail information of the two partial images; and performing a demarcation between the desired 3-D display and the blanking space as a function of the magnitude of the distance.

5. The method of claim 4, further comprising:

modifying the video signals for the blanking space of at least one of the partial images such that the distance is reduced; and feeding these new video signals to the monitor for the purpose of displaying the blanking space of the relevant partial image.

6. The method of claim 4 further comprising:
reducing the distance by virtual displacement of the image signals of the corresponding screen content of both of the partial images; and
feeding modified video signals to their original blanking spaces in order to replace the original video signals.

7. The method of claim 1, further comprising:
interpolating from the image information of the blanking spaces of the two partial images a third, virtual set of image information which corresponds to viewing the blanking spaces in the scene through a third image-acquiring device, which would be arranged in the geometrical middle between two image-acquiring devices; and
replacing with the video signals of the third set of image information, the video signals of the blanking space of at least one partial image with the result that a pure 2-D display is shown there with an aerial perspective.

8. The method of claim 1, further comprising:
displaying the image information of the blanking space on the monitor in two dimensions and with at least one of the following attributes: reduced luminosity or in false color; and
representing a dividing line between the desired 3-D display and the blanking space by a colored dividing line capable of being blanked out.

9. The method of claim 1, further comprising:
automatically adjusting two image-acquiring devices for taking images which are to be displayed on the monitor, such that a focal plane coincides with the convergence plane; and
determining the two spaces by sensing display sharpness at CCDs of the image-acquiring devices.

10. A device for carrying out a method according to claim 1, the device comprising:
image-acquiring devices for generating stereoscopic video images;
camera electronic systems of a camera synchronization device;
an image computer for acquiring and converting image signals; and
a monitor for displaying the image signals.

11. The device of claim 10, further comprising means which permit a viewer to vary between individual or combinations of several method steps according to claim 1.

12. The device of claim 10, characterized by use in a video stereomicroscope.

13. A device for carrying out the method of claim 1, wherein the blanking space and the desired 3-D display can optionally be blanked out and faded in by the user, and wherein the desired 3-D display can be displayed using interpolated 2-D information.

14. Device according to claim 13, characterized by use in a stereomicroscope.

15. A method for processing inputted stereoscopic video images which are composed of two partial images, the method comprising:
determining a position of a convergence plane, wherein the convergence plane corresponds to two optical beam paths which are associated, respectively, with each of the partial images;
categorizing points in the stereoscopic video images into at least two regions based on a measure of distance of each point from the convergence plane;
processing the points in at least one of the regions of at least one partial image, such that upon display of the stereoscopic video images a processed region is differentiated from other regions.

16. The method of claim 15 for processing inputted stereoscopic video images which are composed of two partial images, wherein:
the categorizing of points in the stereoscopic video images into at least two regions comprises:
determining which points in the stereoscopic video images have a distance from the convergence plane which is greater than a specified threshold distance;
classifying into a far region those points in the stereoscopic video images which have a distance from the convergence plane which is greater than the specified threshold distance;
determining which points in the stereoscopic video images have a distance from the convergence plane which is not greater than the specified threshold distance; and
classifying into a near region those points in the stereoscopic video images which have a distance from the convergence plane which is not greater than the specified threshold distance; and
the processed region is the far region.

17. A method of processing inputted stereoscopic video images which are composed of two partial images, the method comprising:
categorizing points in the partial images into at least two regions based on a measure of distance of each point from a convergence plane and wherein a measure of distance of each point from the convergence plane comprises a distance between corresponding image detail information of constituent partial images, the categorizing including:
determining which points have a distance between corresponding image detail information of the constituent partial images which is greater than a specified threshold distance;
classifying into a far region those points in the stereoscopic video images which have a distance between corresponding image detail information of the constituent partial images which is greater than the specified threshold distance;
determining which points have a distance between corresponding image detail information of the constituent partial images which is not greater than the specified threshold distance; and
classifying into a near region those points in the stereoscopic video images which have a distance between corresponding image detail information of the constituent partial images which is not greater than the specified threshold distance; and
displaying the classified near region of the image differently from the classified far region of the image.

18. The method of claim 17 for processing inputted stereoscopic video images which are composed of two partial images, where in the determining which points have a distance between corresponding image detail information of the constituent partial images which is greater, or not greater, than the specified threshold distance comprises:
measuring the distance for at least some of the points; and
extrapolating the distance for remaining points.

19. The method of claim 15 for processing inputted stereoscopic video images which are composed of two partial images, further comprising inputting the stereoscopic video images through the use of an image-acquiring device for each of the partial images, wherein the image-acquiring devices are aligned along a respective optical beam path for each of the partial images.

20. The method of claim 15 for processing inputted stereoscopic video images which are composed of two partial images, further comprising displaying processed stereoscopic video images such that the processed region is differentiated from the other regions.

21. The method of claim 15 for processing inputted stereoscopic video images which are composed of two partial images, wherein the processing the points in at least one of the regions of at least one partial image comprises blanking out at least a portion of one of the regions of at least one partial image.

22. The method of claim 15 for processing inputted stereoscopic video images which are composed of two partial images, wherein the processing the points in at least one of the regions of at least one partial image comprises replacing at least a portion of one of the regions of at least one partial image with a monochrome image.

23. The method of claim 15 for processing inputted stereoscopic video images which are composed of two partial images, wherein the processing the points in at least one of the regions of at least one partial image comprises reducing the luminosity of at least a portion of one of the regions of at least one partial image.

24. A method for processing inputted stereoscopic video images which are composed of two partial images, the method comprising:
   determining a position of a convergence plane, wherein the convergence plane corresponds to two optical beam paths which are associated, respectively, with each of the partial images;
   categorizing points in the stereoscopic video images into at least two regions based on a measure of distance of each point from the convergence plane; and
   processing the points in at least one of the regions of at least one partial image, such that upon display of the stereoscopic video images a processed region is differentiated from other regions,
   wherein the processing the points in at least one of the regions of at least one partial image comprises coloring at least a portion of one of the regions of at least one partial image with false colors.

25. A method for processing inputted stereoscopic video images which are composed of two partial images, the method comprising:
   determining a position of a convergence plane, wherein the convergence plane corresponds to two optical beam paths which are associated, respectively, with each of the partial images;
   categorizing points in the stereoscopic video images into at least two regions based on a measure of distance of each point from the convergence plane, and
   processing the points in at least one of the regions of at least one partial image, such that upon display of the stereoscopic video images a processed region is differentiated from other regions,
   wherein the processing the points in at least one of the regions of at least one partial image comprises displaying at least a portion of one of the regions in two dimensions.

26. A method for processing inputted stereoscopic video images which are composed of two partial images, the method comprising:
   determining a position of a convergence plane, wherein the convergence plane corresponds to two optical beam paths which are associated, respectively, with each of the partial images:
   categorizing points in the stereoscopic video images into at least two regions based on a measure of distance of each point from the convergence plane; and
   processing the points in at least one of the regions of at least one partial image, such that upon display of the stereoscopic video images a processed region is differentiated from other regions,
   wherein the processing the points in at least one of the regions of at least one partial image comprises changing the contrast for at least a portion of one of the regions of at least one partial image.

27. A method for processing inputted stereoscopic video images which are composed of two partial images, the method comprising:
   determining a position of a convergence plane, wherein the convergence plane corresponds to two optical beam paths which are associated, respectively, with each of the partial images;
   categorizing points in the stereoscopic video images into at least two regions based on a measure of distance of each point from the convergence plane; and
   processing the points in at least one of the regions of at least one partial image, such that upon display of the stereoscopic video images a processed region is differentiated from other regions,
   wherein the processing the points in at least one of the regions of at least one partial image comprises changing edge definition for edges in at least a portion of one of the regions of at least one partial image.

28. A method for processing inputted stereoscopic video images which are composed of two partial images, the method comprising:
   determining a position of a convergence plane, wherein the convergence plane corresponds to two optical beam paths which are associated, respectively, with each of the partial images;
   categorizing points in the stereoscopic video images into at least two regions based on a measure of distance of each point from the convergence plane; and
   processing the points in at least one of the regions of at least one partial image, such that upon display of the stereoscopic video images a processed region is differentiated from other regions,
   wherein the processing the points in at least one of the regions of at least one partial image comprises:
      interpolating from image information for one particular region in each of the partial images, using the same region in each partial image, a third, virtual set of image information which corresponds to viewing the one particular region from a point which would be in the geometrical middle of a viewing point for each of the partial images; and
      replacing the image information of the one particular region of at least one partial image with the third set of image information.

29. A method for processing inputted stereoscopic video images which are composed of two partial images, the method comprising:
   determining a position of a convergence plane, wherein the convergence plane corresponds to two optical beam paths which are associated, respectively, with each of the partial images;
   categorizing points in the stereoscopic video images into at least two regions based on a measure of distance of each point from the convergence plane; and processing the points in at least one of the regions of at least one partial image, such that upon display of the stereoscopic video images a processed region is differentiated from other regions, wherein the processing the points in at least one of the regions of at least one partial image comprises producing a line of demarcation along at least a portion of a boundary of the at least one region.

30. A method of processing inputted stereoscopic video images which are composed of two partial images, the method comprising:

categorizing points in the partial images into at least two regions based on a measure of distance of each point from a convergence plane and wherein a measure of distance of each point from the convergence plane comprises a distance between corresponding image detail information of constituent partial images, the categorizing including:

determining which points have a distance between corresponding image detail information of the constituent partial images which is greater than a specified threshold distance;

classifying into a far region those points in the stereoscopic video images which have a distance between corresponding image detail information of the constituent partial images which is greater than the specified threshold distance;

determining which points have a distance between corresponding image detail information of the constituent partial images which is not greater than the specified threshold distance; and classifying into a near region those points in the stereoscopic video images which have a distance between corresponding image detail information of the constituent partial images which is not greater than the specified threshold distance; and displaying the classified near region of the image differently from the classified far region of the image, wherein the image detail information of the far region of at least one of the partial images is modified such that the distance is reduced, whereupon the image detail information of the far region of the at least one partial image is replaced with the modified image detail information.

31. The method of claim 30 for processing inputted stereoscopic video images which are composed of two partial images, wherein the distance is reduced by virtual displacement of the image detail information of the far region of the at least one partial image.

32. A method for processing inputted stereoscopic video images which are composed of two partial images, the method comprising:

inputting the stereoscopic video images through the use of an image-acquiring device for each of the partial images, wherein the image-acquiring devices are aligned alone a respective optical beam path for each of the partial images;

determining a position of a convergence plane, wherein the convergence plane corresponds to two optical beam paths which are associated, respectively, with each of the partial images;

categorizing points in the stereoscopic video images into at least two regions based on a measure of distance of each point from the convergence plane; and processing the points in at least one of the regions of at least one partial image, such that upon display of the stereoscopic video images a processed region is differentiated from other regions, wherein the categorizing of points in the stereoscopic video images into at least two regions based on a distance of each point from the convergence plane comprises:

adjusting the image-acquiring devices such that a focal plane coincides with the convergence plane; and categorizing points by sensing the display sharpness at the image-acquiring devices, thus determining the measure of distance of each point from the convergence plane.

33. A system for processing inputted stereoscopic video images which are composed of two partial images, comprising:

means for determining a position of a convergence plane, wherein the convergence plane corresponds to at least two optical beam paths which are associated, respectively, with each of the partial images;

means for categorizing points in the stereoscopic video images into at least two regions based on a distance of each point from the convergence plane; and means for processing the points in at least one of the regions of at least one partial image, such that upon display of the stereoscopic video images a processed region is differentiated from the other regions.

34. A system for processing inputted stereoscopic video images which are composed of two partial images, comprising:

an image-acquiring device for generating video stereoscopic images; and an image computer for:

determining a position of a convergence plane, wherein the convergence plane corresponds to at least two optical beam paths which are associated, respectively, with each of the partial images;

categorizing points in the stereoscopic video images into at least two regions based on a distance of each point from the convergence plane; and processing the points in at least one of the regions of at least one partial image, such that upon display of the stereoscopic video images a processed region is differentiated from the other regions.

35. The system of claim 34, wherein the generated video stereoscopic images are stereomicroscopic images.

36. A method of modifying a three-dimensional ("3-D") video image, the method comprising:

splitting the 3-D video image into two regions based, at least in part, on a distance between image points of the 3-D video image and a specified plane within a three-dimensional space of the 3-D video image;

modifying the 3-D video image to differentiate the two regions; and displaying the modified 3-D video image, which contains the differentiated regions.

37. The method of claim 36, wherein modifying the 3-D image to differentiate the two regions comprises changing the appearance of one of the two regions.

38. The method of claim 36, wherein modifying the 3-D image to differentiate the two regions comprises inserting a border between the two regions.

39. The method of claim 36, wherein the 3-D image is a stereomicroscopic image.

40. The method of claim 36, wherein:

the 3-D image comprises two partial images of a stereoscopic video image;

the splitting of the 3-D image into two regions comprises:
   determining a position of a convergence plane, wherein the convergence plane corresponds to two optical beam paths which are associated, respectively, with each of the partial images; and
   categorizing points in the 3-D image into at least two regions based on a measure of distance of each point from the convergence plane; and
the modifying of the 3-D image comprises processing the points in at least one of the regions of at least one partial image, such that upon display of the 3-D image a processed region is differentiated from other regions.

41. The method of claim 36, wherein:
the 3-D image comprises two partial images of a stereoscopic video image;
the splitting of the 3-D image into two regions comprises:
   determining a position of a convergence plane, wherein the convergence plane corresponds to two optical beam paths which are associated, respectively, with each of the partial images;
   determining which points in the 3-D image have a distance from the convergence plane which is greater than a specified threshold distance;
   classifying into a far region those points in the 3-D image which have a distance from the convergence plane which is greater than the specified threshold distance;
   determining which points in the 3-D image have a distance from the convergence plane which is not greater than the specified threshold distance; and
   classifying into a near region those points in the 3-D image which have a distance from the convergence plane which is not greater than the specified threshold distance; and
the modifying of the 3-D image comprises processing the points in the far region of at least one partial image, such that upon display of the 3-D image the far region is differentiated from other regions.

42. A method of modifying a three-dimensional ("3-D") image, the method comprising:
   splitting the image into two regions based, at least in part, on a distance between image points of the 3-D image and a specified plane within a three-dimensional space of the 3-D image;
   modifying the 3-D image to differentiate the two regions; and
   displaying the modified 3-D image,
wherein:
   the 3-D image comprises two partial images of a stereoscopic video image;
   the splitting of the 3-D image into two regions comprises categorizing points in the partial images into at least two regions based on a measure of distance of each point from a convergence plane and wherein a measure of distance of each point from the convergence plane comprises a distance between corresponding image detail information of constituent partial images, the categorizing including:
      determining which points have a distance between corresponding image detail information of the constituent partial images which is greater than a specified threshold distance;
      classifying into a far region those points in the 3-D image which have a distance between corresponding image detail information of the constituent partial images which is greater than the specified threshold distance;
      determining which points have a distance between corresponding image detail information of the constituent partial images which is not greater than the specified threshold distance; and
      classifying into a near region those points in the 3-D image which have a distance between corresponding image detail information of the constituent partial images which is not greater than the specified threshold distance; and
   the displaying of the modified 3-D image comprises displaying the classified near region of the image differently from the classified far region of the image.

43. The method of claim 42, wherein the determining which points have a distance between corresponding image detail information of the constituent partial images which is greater, or not greater, than the specified threshold distance comprises:
   measuring the distance for at least some of the points; and
   extrapolating the distance for remaining points.

44. A method of modifying a three-dimensional ("3-D") image, the method comprising:
   splitting the image into two regions based, at least in part, on a distance between image points of the 3-D image and a specified plane within a three-dimensional space of the 3-D image;
   modifying the 3-D image to differentiate the two regions; and
   displaying the modified 3-D image,
wherein
   the 3-D image comprises two partial images of a stereoscopic video image;
   the splitting of the 3-D image into two regions comprises:
      determining a position of a convergence plane, wherein the convergence plane corresponds to two optical beam paths which are associated, respectively, with each of the partial images; and
      categorizing points in the 3-D image into at least two regions based on a measure of distance of each point from the convergence plane; and
   the modifying of the 3-D image comprises processing the points in at least one of the regions of at least one partial image, such that upon display of the 3-D image a processed region is differentiated from other regions, and
   further comprising inputting the 3-D image through the use of an image-acquiring device for each of the partial images, wherein the image-acquiring devices are aligned along a respective optical beam path for each of the partial images.

45. A method of modifying a three-dimensional ("3-D") image, the method comprising:
   splitting the image into two regions based, at least in part, on a distance between image points of the 3-D image and a specified plane within a three-dimensional space of the 3-D image;
   modifying the 3-D image to differentiate the two regions; and
   displaying the modified 3-D image,
wherein
   the 3-D image comprises two partial images of a stereoscopic video image;
   the splitting of the 3-D image into two regions comprises:
      determining a position of a convergence plane, wherein the convergence plane corresponds to two optical beam paths which are associated, respectively with each of the partial images; and categorizing points in the 3-D image into at least two regions based on a measure of distance of each point from the convergence plane; and the modifying of the 3-D image comprises processing the points in at least one of the regions of at least one partial image, such that upon display of the 3-D image a processed region is differentiated from other regions, wherein the processed region is differentiated from the other regions when the modified 3-D image is displayed.

46. A method of modifying a three-dimensional ("3-D") image, the method comprising:

splitting the image into two regions based, at least in part, on a distance between image points of the 3-D image and a specified plane within a three-dimensional space of the 3-D image;

modifying the 3-D image to differentiate the two regions; and displaying the modified 3-D image, wherein the 3-D image comprises two partial images of a stereoscopic video image;

the splitting of the 3-D image into two regions comprises:
determining a position of a convergence plane, wherein the convergence plane corresponds to two optical beam paths which are associated, respectively, with each of the partial images; and categorizing points in the 3-D image into at least two regions based on a measure of distance of each point from the convergence plane; and the modifying of the 3-D image comprises processing the points in at least one of the regions of at least one partial image, such that upon display of the 3-D image a processed region is differentiated from other regions, and wherein at least a portion of one of the regions of at least one partial image is blanked out.

47. A method of modifying a three-dimensional ("3-D") image, the method comprising:

splitting the image into two regions based, at least in part, on a distance between image points of the 3-D image and a specified plane within a three-dimensional space of the 3-D image;

modifying the 3-D image to differentiate the two regions; and displaying the modified 3-D image, wherein the 3-D image comprises two partial images of a stereoscopic video image;

the splitting of the 3-D image into two regions comprises:
determining a position of a convergence plane, wherein the convergence plane corresponds to two optical beam paths which are associated, respectively, with each of the partial images; and categorizing points in the 3-D image into at least two regions based on a measure of distance of each point from the convergence plane; and the modifying of the 3-D image comprises processing the points in at least one of the regions of at least one partial image, such that upon display of the 3-D image a processed region is differentiated from other regions, and wherein at least a portion of one of the regions of at least one partial image is replaced with a monochrome image.

48. A method of modifying a three-dimensional ("3-D") image, the method comprising:

splitting the image into two regions based, at least in part, on a distance between image points of the 3-D image and a specified plane within a three-dimensional space of the 3-D image;

modifying the 3-D image to differentiate the two regions; and displaying the modified 3-D image, wherein the 3-D image comprises two partial images of a stereoscopic video image;

the splitting of the 3-D image into two regions comprises:
determining a position of a convergence plane, wherein the convergence plane corresponds to two optical beam paths which are associated, respectively, with each of the partial images; and categorizing points in the 3-D image into at least two regions based on a measure of distance of each point from the convergence plane; and the modifying of the 3-D image comprises processing the points in at least one of the regions of at least one partial image, such that upon display of the 3-D image a processed region is differentiated from other regions, and wherein the luminosity of at least a portion of one of the regions of at least one partial image is reduced.

49. A method of modifying a three-dimensional ("3-D") image, the method comprising:

splitting the image into two regions based, at least in part, on a distance between image points of the 3-D image and a specified plane within a three-dimensional space of the 3-D image;

modifying the 3-D image to differentiate the two regions; and displaying the modified 3-D image, wherein the 3-D image comprises two partial images of a stereoscopic video image;

the splitting of the 3-D image into two regions comprises:
determining a position of a convergence plane, wherein the convergence plane corresponds to two optical beam paths which are associated, respectively with each of the partial images; and categorizing points in the 3-D image into at least two regions based on a measure of distance of each point from the convergence plane; and the modifying of the 3-D image comprises processing the points in at least one of the regions of at least one partial image, such that upon display of the 3-D image a processed region is differentiated from other regions, and wherein at least a portion of one of the regions of at least one partial image is colored with false colors.

50. A method of modifying a three-dimensional ("3-D") image, the method comprising:

splitting the image into two regions based, at least in part, on a distance between image points of the 3-D image and a specified plane within a three-dimensional space of the 3-D image;

modifying the 3-D image to differentiate the two regions; and displaying the modified 3-D image, wherein the 3-D image comprises two partial images of a stereoscopic video image;

the splitting of the 3-D image into two regions comprises:
determining a position of a convergence plane, wherein the convergence plane corresponds to two optical beam paths which are associated, respectively, with each of the partial images; and
categorizing points in the 3-D image into at least two regions based on a measure of distance of each point from the convergence plane; and the modifying of the 3-D image comprises processing the points in at least one of the regions of at least one partial image, such that upon display of the 3-D image a processed region is differentiated from other regions, and wherein at least a portion of one of the regions is displayed in two dimensions.

51. A method of modifying a three-dimensional ("3-D") image, the method comprising:

splitting the image into two regions based, at least in part, on a distance between image points of the 3-D image and a specified plane within a three-dimensional space of the 3-D image;

modifying the 3-D image to differentiate the two regions; and displaying the modified 3-D image, wherein the 3-D image comprises two partial images of a stereoscopic video image;

the splitting of the 3-D image into two regions comprises:
determining a position of a convergence plane, wherein the convergence plane corresponds to two optical beam paths which are associated, respectively, with each of the partial images; and
categorizing points in the 3-D image into at least two regions based on a measure of distance of each point from the convergence plane, and the modifying of the 3-D image comprises processing the points in at least one of the regions of at least one partial image, such that upon display of the 3-D image a processed region is differentiated from other regions, and wherein the contrast is changed for at least a portion of one of the regions of at least one partial image.

52. A method of modifying a three-dimensional ("3-D") image, the method comprising:

splitting the image into two regions based, at least in part, on a distance between image points of the 3-D image and a specified plane within a three-dimensional space of the 3-D image;

modifying the 3-D image to differentiate the two regions; and displaying the modified 3-D image, wherein the 3-D image comprises two partial images of a stereoscopic video image;

the splitting of the 3-D image into two regions comprises:
determining a position of a convergence plane, wherein the convergence plane corresponds to two optical beam paths which are associated, respectively, with each of the partial images; and
categorizing points in the 3-D image into at least two regions based on a measure of distance of each point from the convergence plane; and the modifying of the 3-D image comprises processing the points in at least one of the regions of at least one partial image, such that upon display of the 3-D image a processed region is differentiated from other regions, and wherein the edge definition is changed for edges in at least a portion of one of the regions of at least one partial image.

53. A method of modifying a three-dimensional ("3-D") image, the method comprising:

splitting the image into two regions based, at least in part, on a distance between image points of the 3-D image and a specified plane within a three-dimensional space of the 3-D image;

modifying the 3-D image to differentiate the two regions; and displaying the modified 3-D image, wherein the 3-D image comprises two partial images of a stereoscopic video image;

the splitting of the 3-D image into two regions comprises:
determining a position of a convergence plane, wherein the convergence plane corresponds to two optical beam paths which are associated, respectively, with each of the partial images; and
categorizing points in the 3-D image into at least two regions based on a measure of distance of each point from the convergence plane; and the modifying of the 3-D image comprises processing the points in at least one of the regions of at least one partial image, such that upon display of the 3-D image a processed region is differentiated from other regions, and wherein the modifying of the 3-D image comprises:
interpolating from image information for one particular region in each of the partial images, using the same region in each partial image, a third, virtual set of image information which corresponds to viewing the one particular region from a point which would be in the geometrical middle of a viewing point for each of the partial images; and
replacing the image information of the one particular region of at least one partial image with the third set of image information.

54. The method of claim 42, wherein the image detail information of the far region of at least one of the partial images is modified such that the distance is reduced, whereupon the image detail information of the far region of the at least one partial image is replaced with the modified image detail information.

55. The method of claim 42, wherein the image detail information of the far region of at least one of the partial images is modified such that the distance is reduced by virtual displacement of the image detail information of the far region of the at least one partial image, whereupon the image detail information of the far region of the at least one partial image is replaced with the modified image detail information.

56. The method of claim 44, wherein the categorizing of points in the 3-D image into at least two regions based on a distance of each point from the convergence plane comprises:
adjusting the image-acquiring devices such that a focal plane coincides with the convergence plane; and
categorizing points by sensing the display sharpness at the image-acquiring devices, thus determining the measure of distance of each point from the convergence plane.

* * * * *